US012770443B2

(12) United States Patent
Lee

(10) Patent No.: US 12,770,443 B2
(45) Date of Patent: Oct. 20, 2026

(54) EVENT DETECTION DEVICE AND METHOD THEREFOR

(71) Applicant: PARTRIDGE SYSTEMS, INC., Yongin-si (KR)

(72) Inventor: Jun Ha Lee, Seoul (KR)

(73) Assignee: PARTRIDGE SYSTEMS, INC., Yongin-si (KR)

( * ) Notice: Subject to any disclaimer, the term of this patent is extended or adjusted under 35 U.S.C. 154(b) by 328 days.

(21) Appl. No.: 18/271,555

(22) PCT Filed: Nov. 22, 2021

(86) PCT No.: PCT/KR2021/017131
§ 371 (c)(1),
(2) Date: Jul. 10, 2023

(87) PCT Pub. No.: WO2022/169076
PCT Pub. Date: Aug. 11, 2022

(65) Prior Publication Data

US 2024/0071147 A1 Feb. 29, 2024

(30) Foreign Application Priority Data

Feb. 2, 2021 (KR) ........................ 10-2021-0014565

(51) Int. Cl.
*G07C 5/04* (2006.01)

(52) U.S. Cl.
CPC ...................................... *G07C 5/04* (2013.01)

(58) Field of Classification Search
CPC ........................................................ G07C 5/04
See application file for complete search history.

(56) References Cited

U.S. PATENT DOCUMENTS

2017/0118018 A1* 4/2017 Dekker ................. G06F 21/602
2020/0379823 A1* 12/2020 Lehmann .............. G06F 21/554
2022/0334941 A1* 10/2022 Asai .................... G06F 11/0775

FOREIGN PATENT DOCUMENTS

JP 2007-172221 A 7/2007
JP 2007-220078 A 8/2007
JP 2012-212227 A 11/2012
KR 10-2018-0014992 A 2/2018
(Continued)

OTHER PUBLICATIONS

English Translation of JP2012212227A Title: Event Processing System, and Event Processing Method and Event Processing Program Author: Mikami et al. Date: Nov. 1, 2012 (Year: 2012).*
(Continued)

*Primary Examiner* — Steven Vu Nguyen
(74) *Attorney, Agent, or Firm* — Sughrue Mion, PLLC

(57) ABSTRACT

The present invention provides an apparatus for detecting events and a method thereof. The apparatus for detecting events according to embodiments of the present invention may include a rule register for registering rules for event detection and a tag value assigned to the rules; and an event detector for obtaining monitoring data and a tag value assigned to the monitoring data, determining a rule related to the monitoring data among the pre-registered rules using the obtained tag value, and detecting an event in the monitoring data by applying the determined rule.

14 Claims, 13 Drawing Sheets

(56) References Cited

FOREIGN PATENT DOCUMENTS

| | | | |
|---|---|---|---|
| KR | 10-2019-0107080 | A | 9/2019 |
| KR | 10-2060662 | A | 12/2019 |

OTHER PUBLICATIONS

English Translation of KR20100013910A Title: Event Rule-Based System and Method for Integrated U-City Monitoring Services Author: Lee et al. Date: Feb. 10, 2010 (Year: 2010).*

International Search Report for PCT/KR2021/017131, dated Jan. 14, 2022.

Office Action for Japanese Patent App. No. 2023-540792 issued from Japanese Patent Office on Jul. 30, 2024.

* cited by examiner

【FIG. 1】
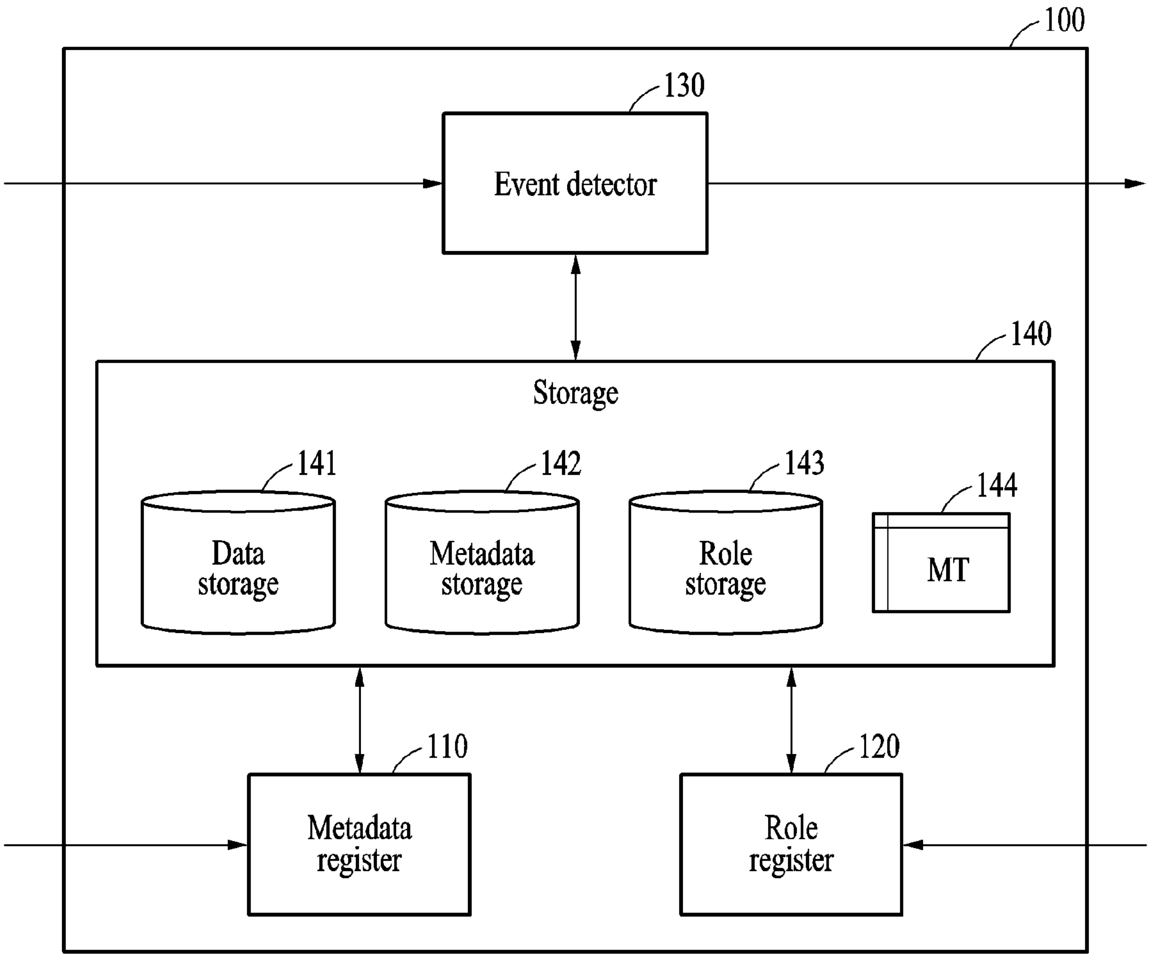

【FIG. 2】
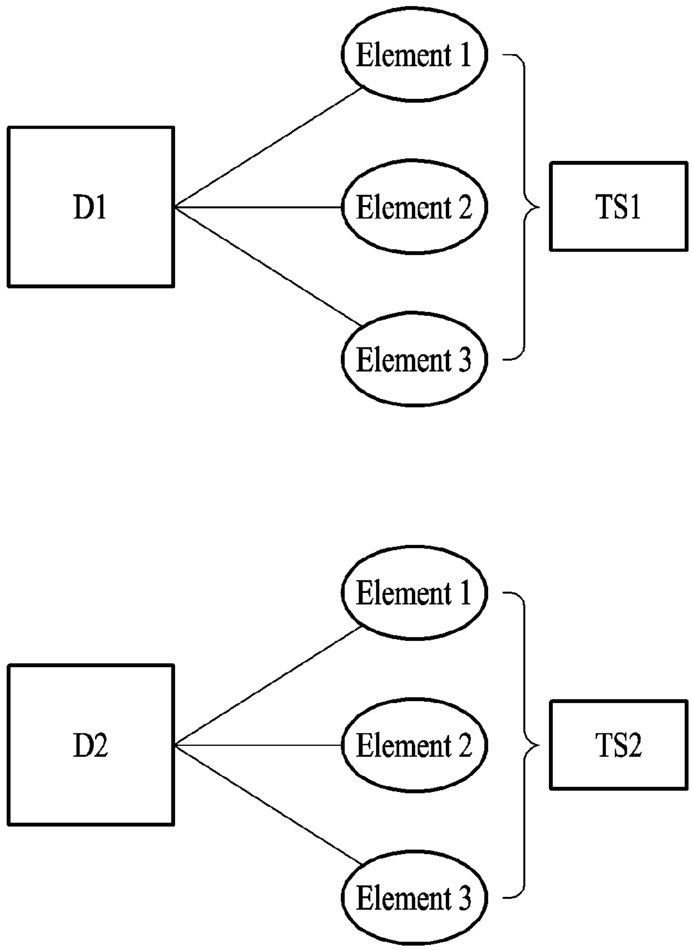

【FIG. 3】
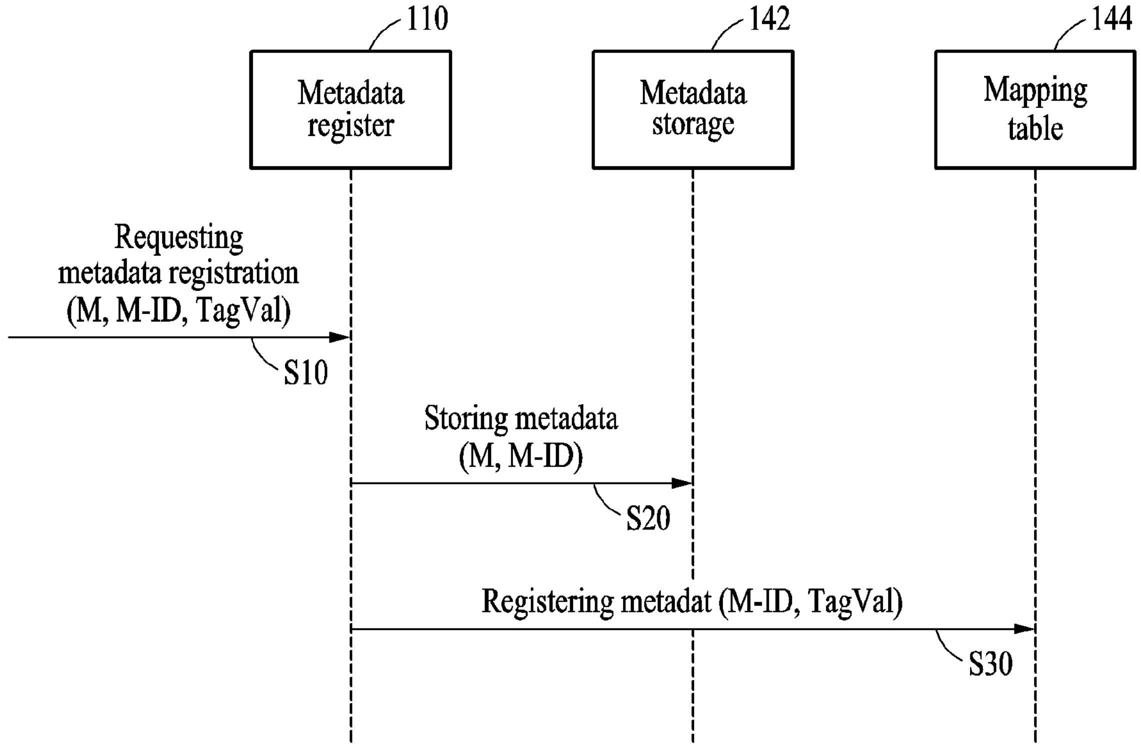
【FIG. 4】
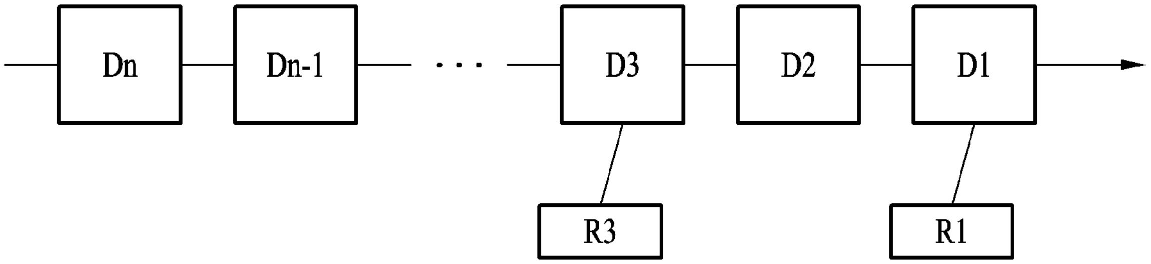

【FIG. 5】
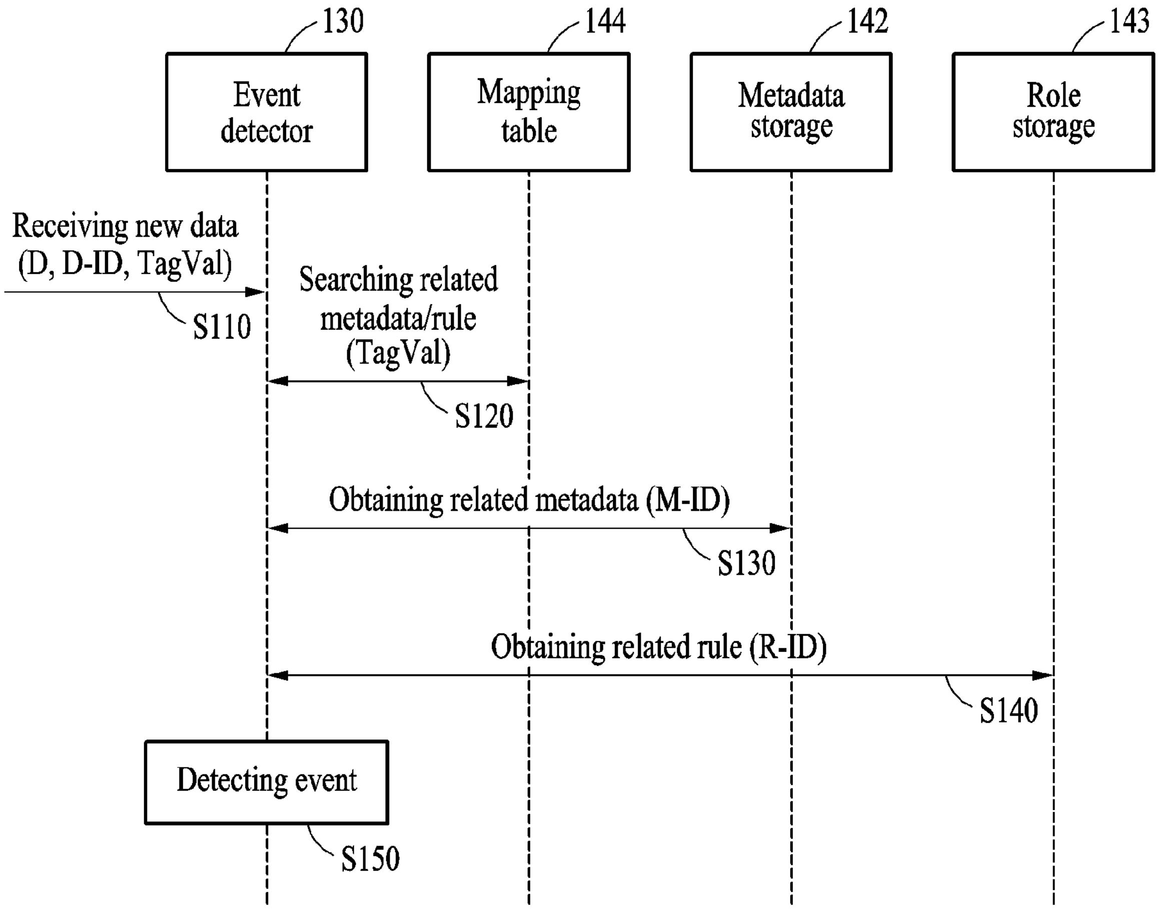

【FIG. 6】
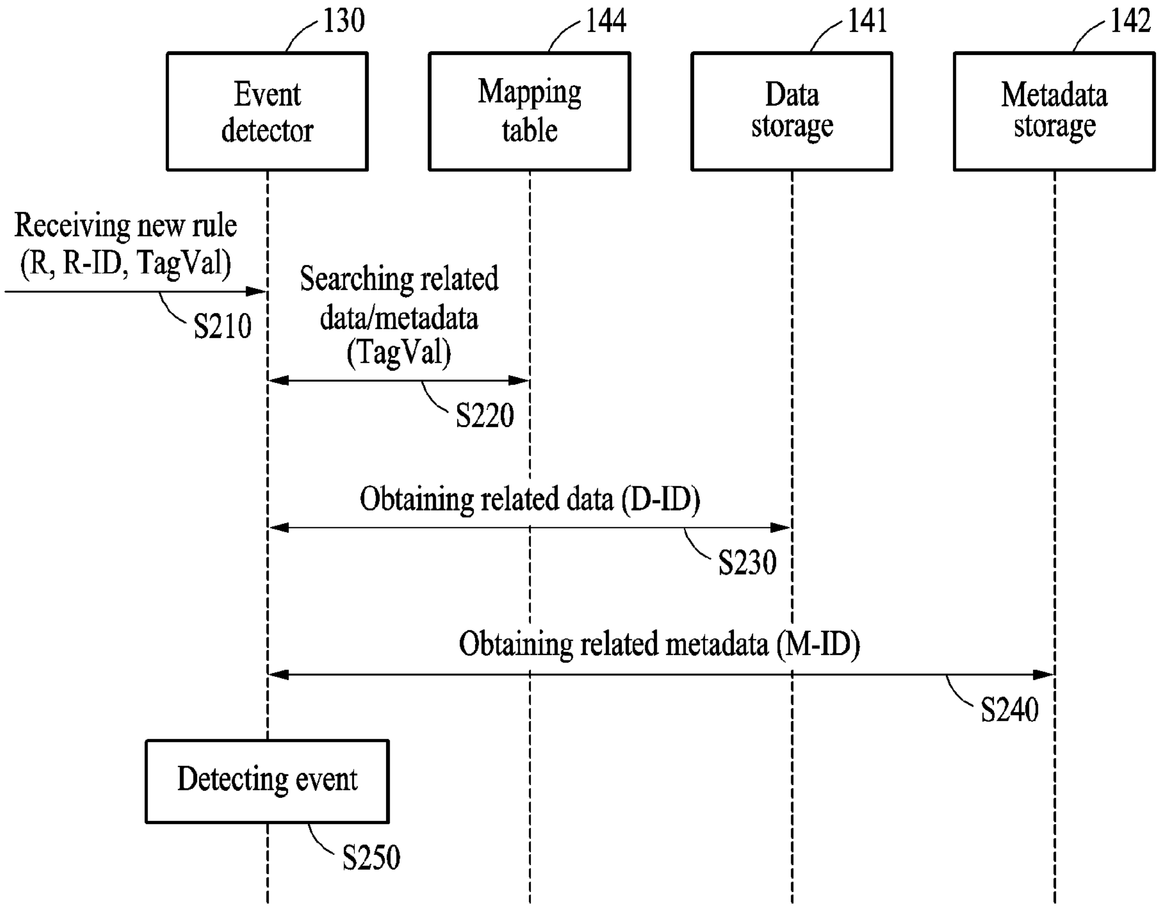

【FIG. 7】
144
| Mapping Table | | | |
|---|---|---|---|
| Key | Meta | Data | Rule |
| Tag1 | M1 | D1 | R1 |
| Tag2 | M2 | D2 | R1,R2 |
| Tag3 | M3 | D2,D3 | R3 |
| Tag4 | M4 | | R1,R2 |
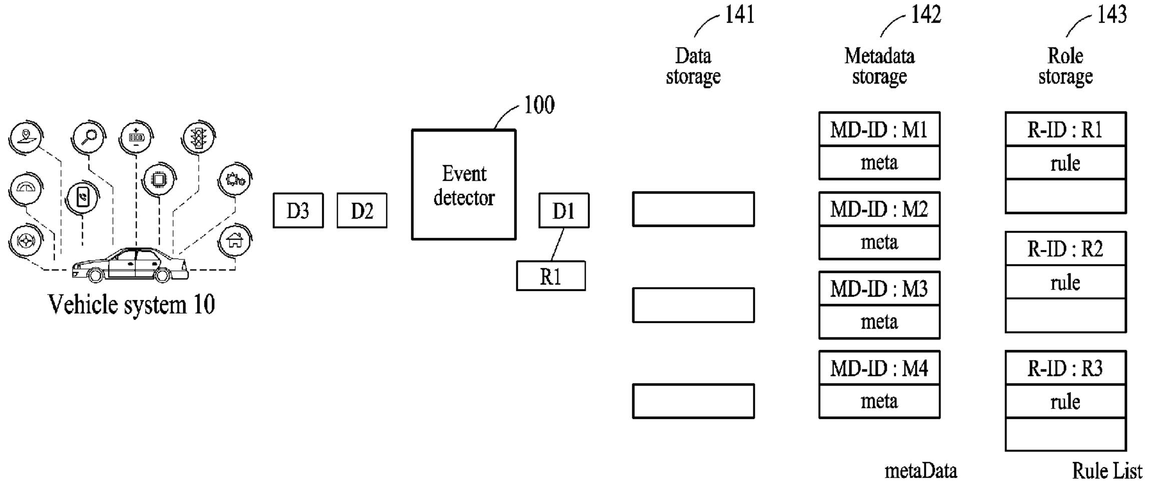

【FIG. 8】
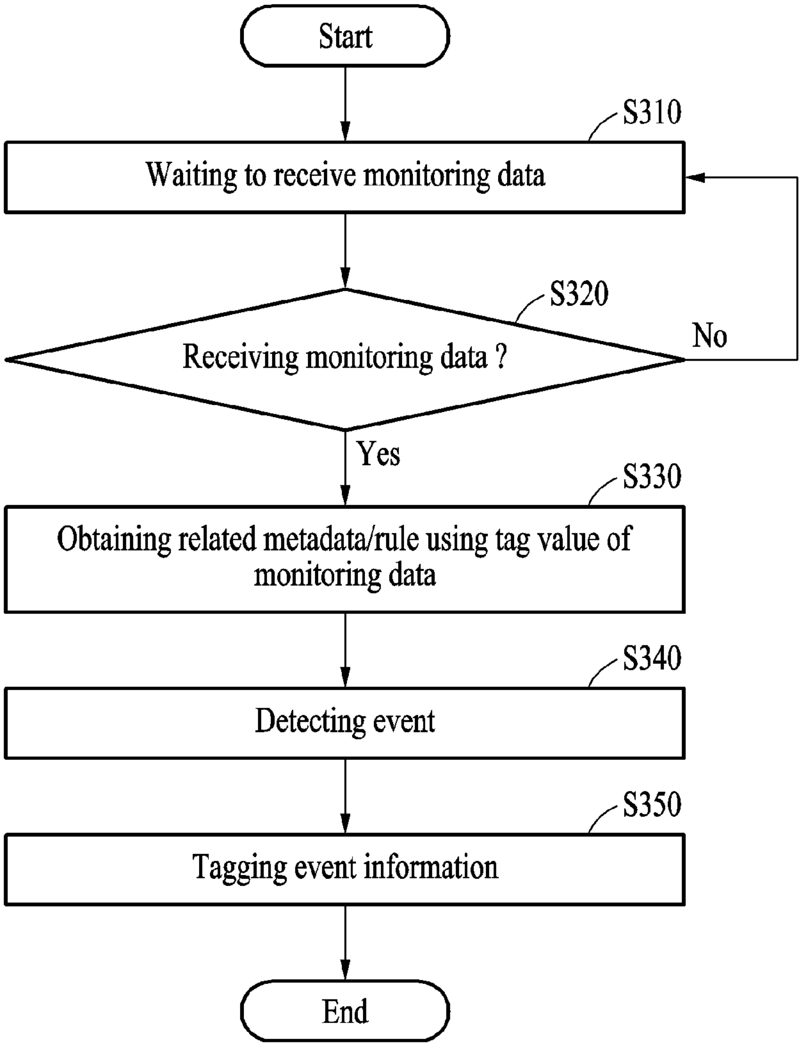

【FIG. 9】
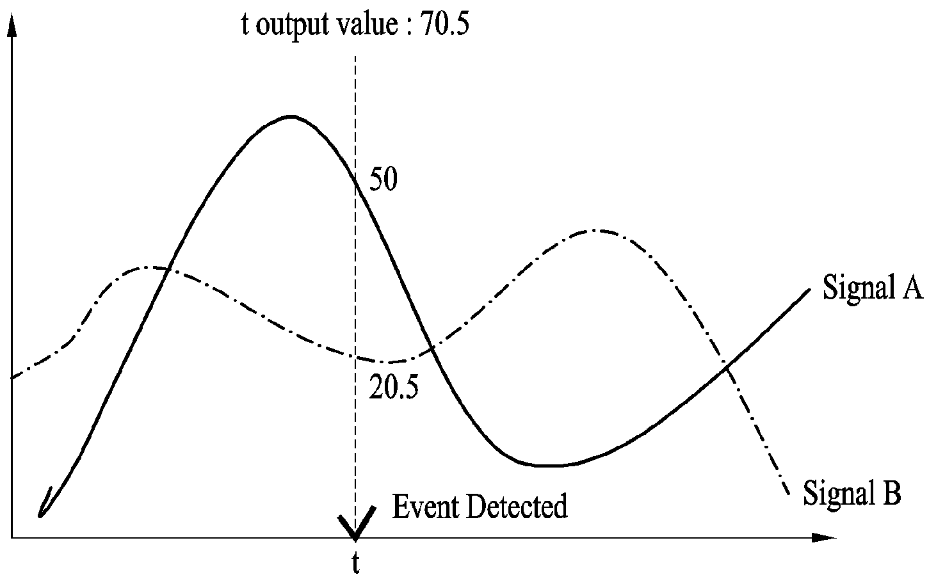
【FIG. 10】
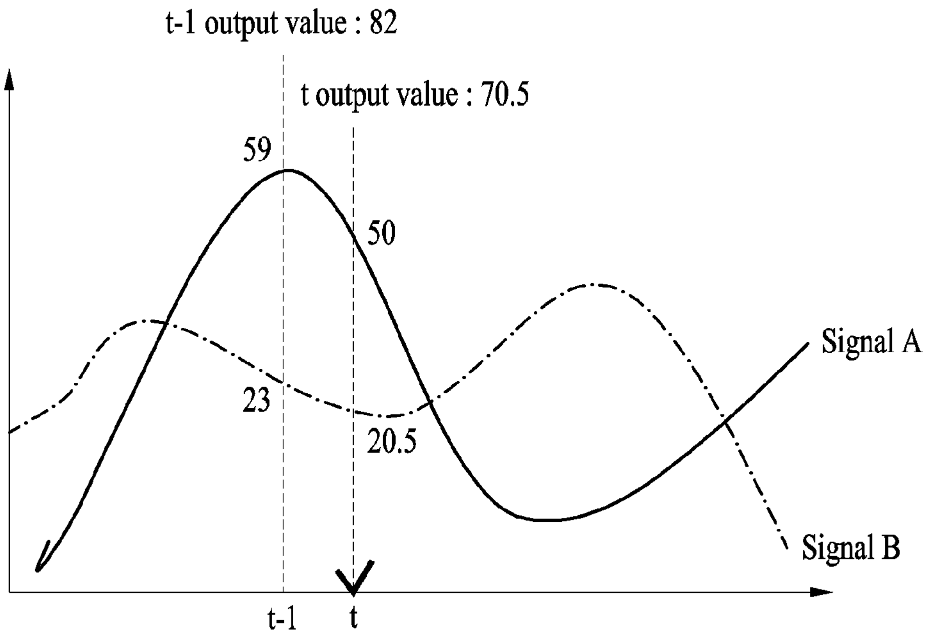

【FIG. 11】
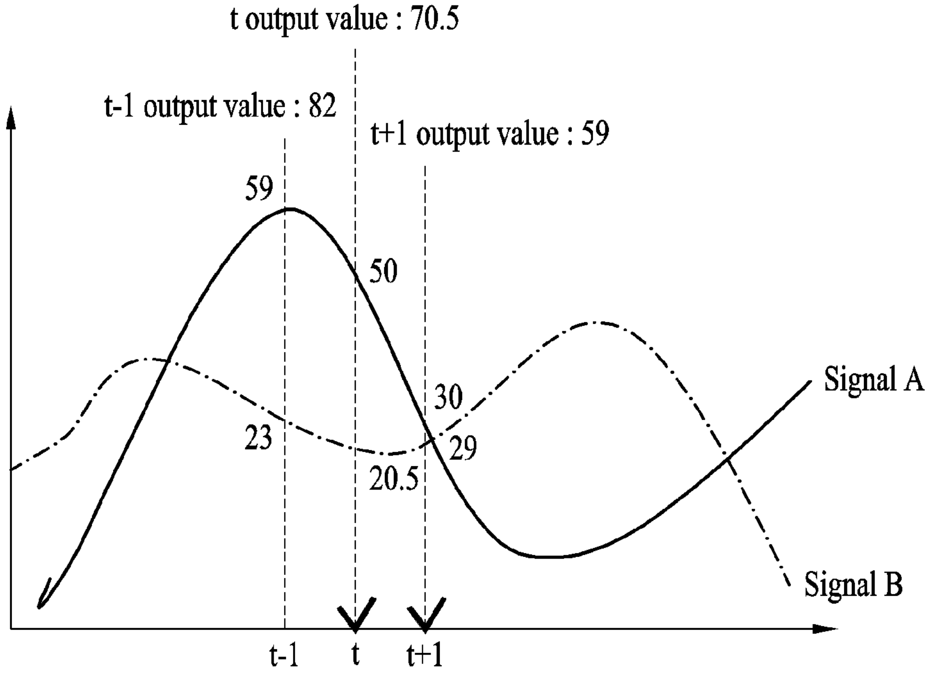
【FIG. 12】
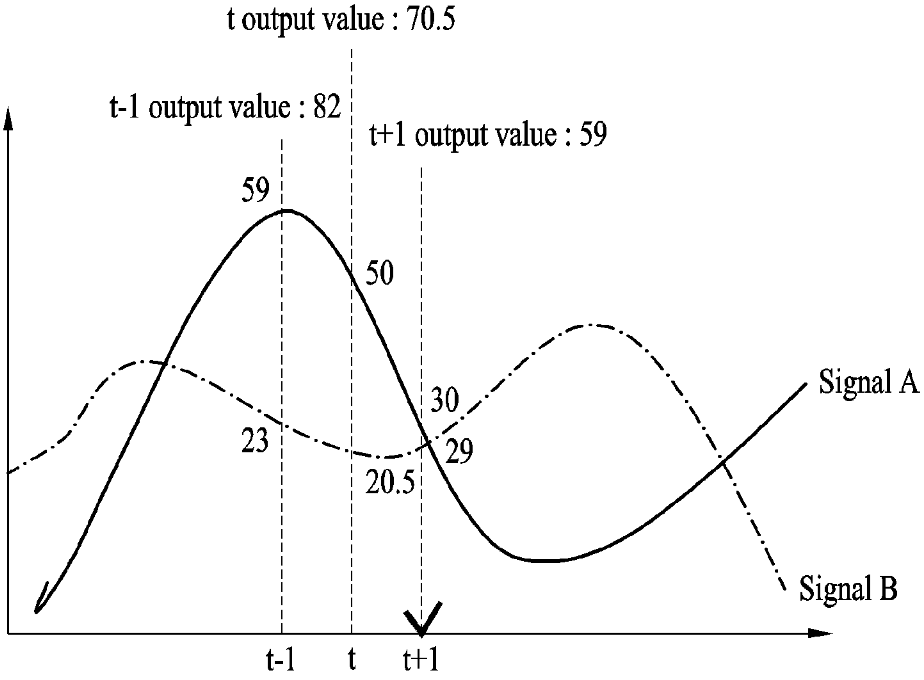

【FIG. 13】
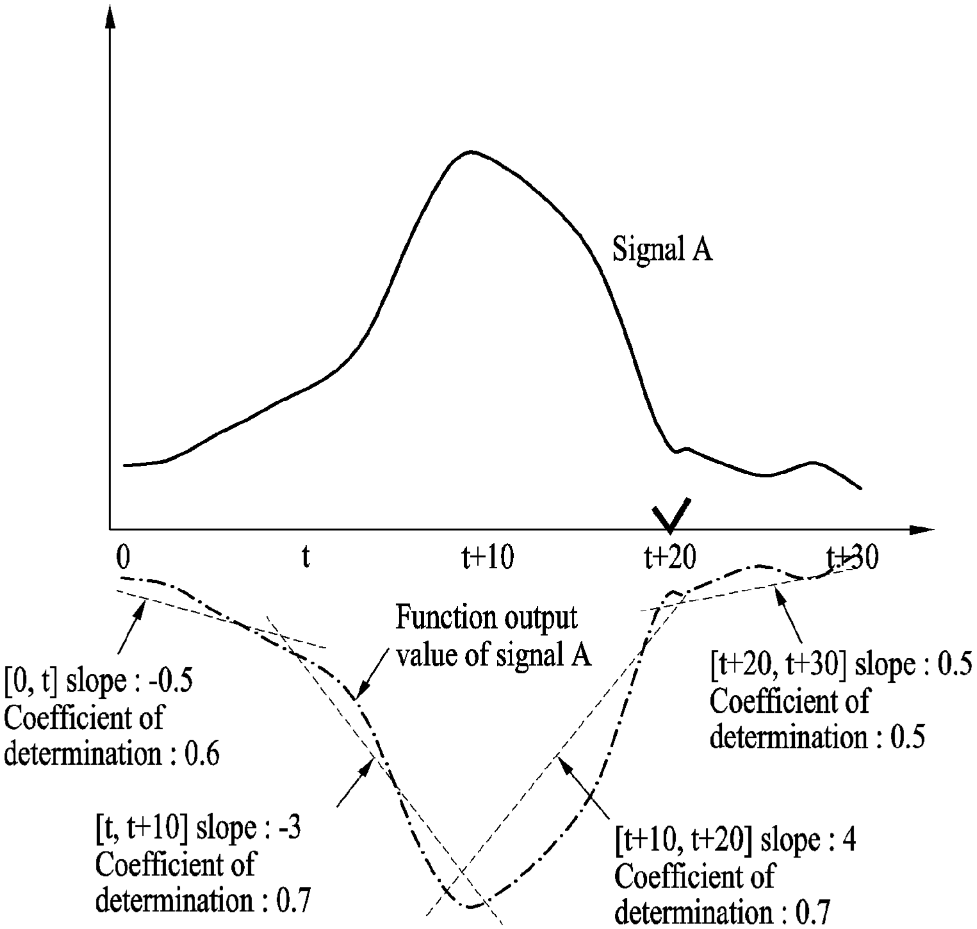

【FIG. 14】
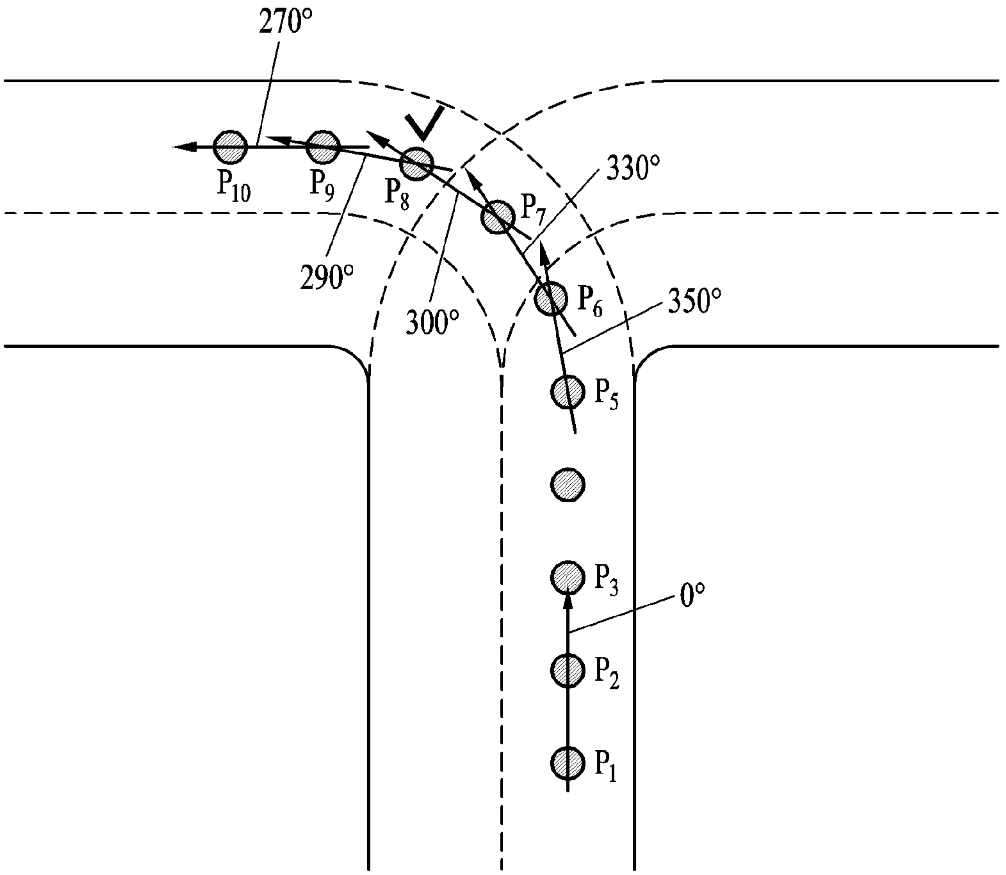
【FIG. 15】
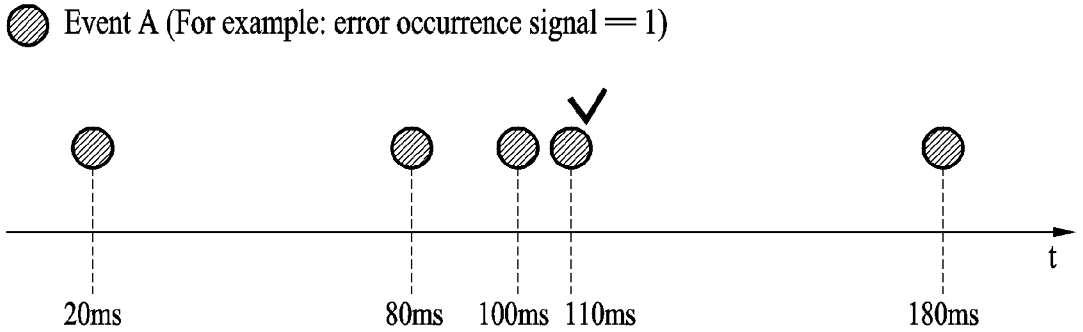

【FIG. 16】
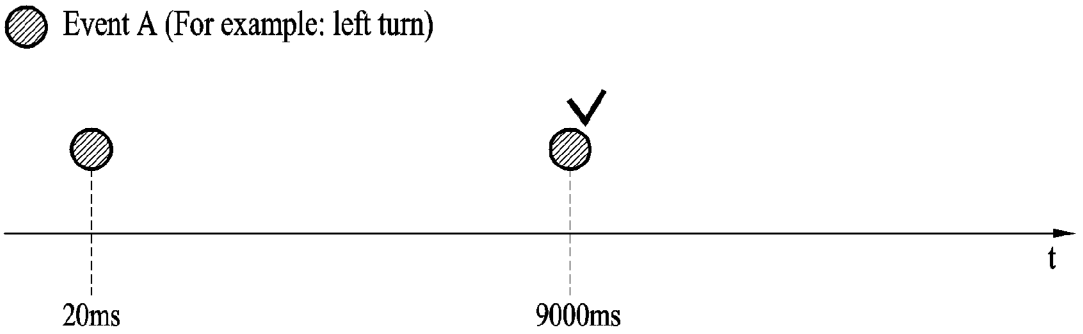
【FIG. 17】
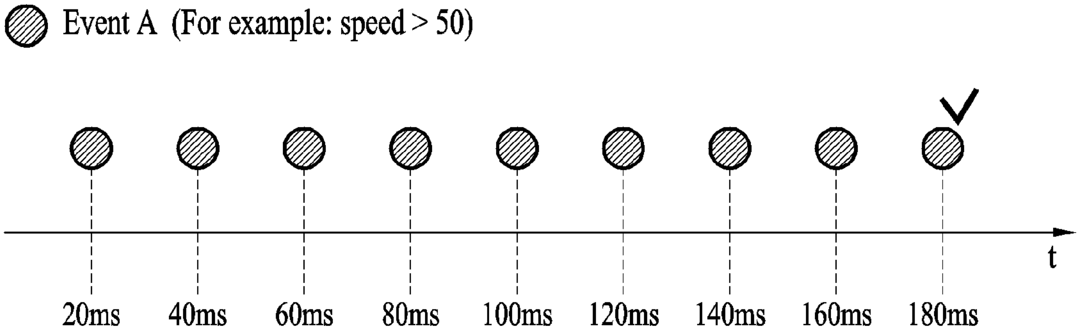
【FIG. 18】
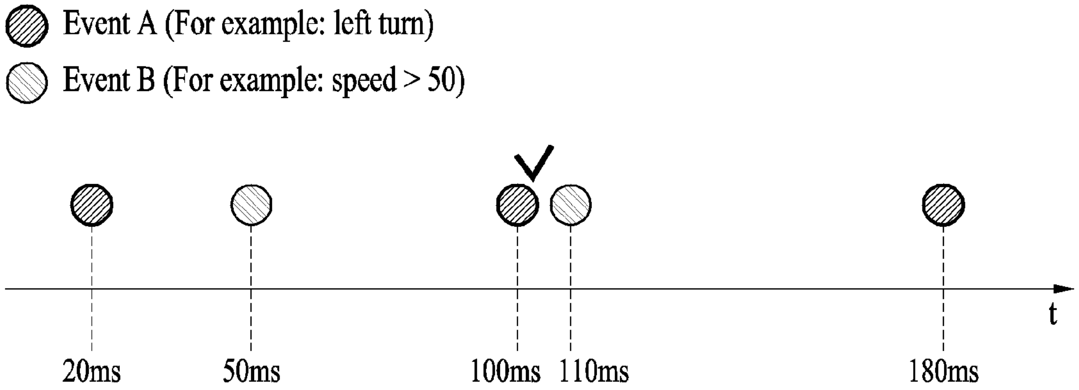

【FIG. 19】
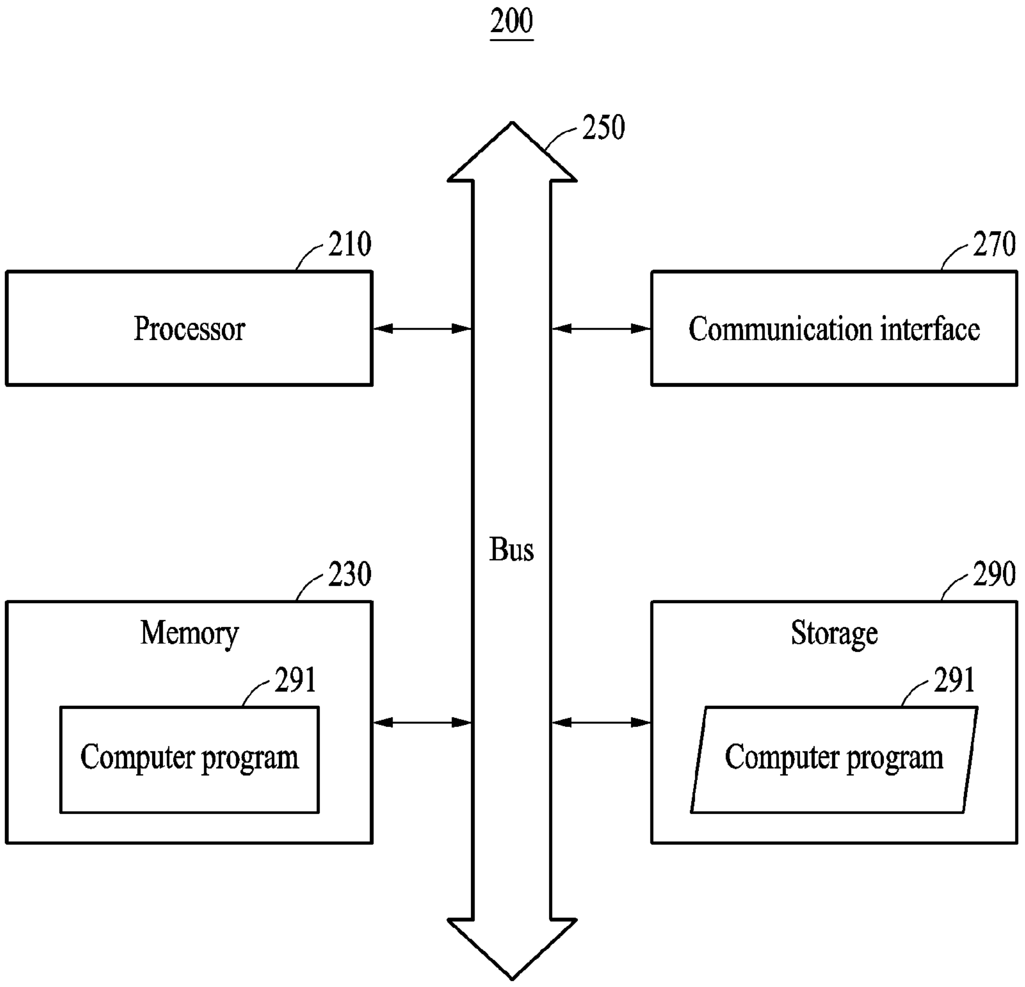

EVENT DETECTION DEVICE AND METHOD THEREFOR

CROSS REFERENCE TO RELATED APPLICATIONS

This application is a National Stage Entry of PCT International Application No. PCT/KR2021/017131, which was filed on Nov. 22, 2021, and claims priority to Korean Patent Application No. 10-2021-0014565, filed on Feb. 2, 2021, in the Korean Intellectual Property Office, the disclosure of which is incorporated herein by reference.

TECHNICAL FIELD

The present invention relates to an apparatus for detecting events and a method thereof, and more particularly, to an apparatus for automatically detecting events from massive data and tagging the detected event information and a method thereof.

BACKGROUND ART

As sensor technology develops, the demand for a method of automatically detecting and tagging points of interest from continuously generated massive data is rapidly increasing. For example, a vehicle system having a plurality of sensors generates a large amount of sensing data related to vehicle operation. There is a demand for a method of efficiently detecting a specific driving situation (e.g., a situation where a vehicle suddenly brakes while turning right) by analyzing such large-capacity sensing data.

DISCLOSURE

Technical Problem

Therefore, the present invention has been made in view of the above problems, and it is one object of the present invention to provide an apparatus for automatically detecting events from massive data and tagging the detected event information and a method thereof.

It is another object of the present invention to provide rules capable of detecting various events.

However, the technical problems to be solved by the present invention is not limited to the above-mentioned problems, and other problems not mentioned herein can be clearly understood by those skilled in the art from the following description.

Technical Solution

In accordance with one aspect of the present invention, provided is an apparatus for detecting events including a rule register for registering rules for event detection and a tag value assigned to the rules; and an event detector for obtaining monitoring data and a tag value assigned to the monitoring data, determining a rule related to the monitoring data among the pre-registered rules using the obtained tag value, and detecting an event in the monitoring data by applying the determined rule.

In embodiments, the monitoring data may be tagged with information about the detected event by the event detector.

In embodiments, the rule register may store the rule in a role storage and may register an identifier of the rule and a tag value assigned to the rule in a mapping table, and the event detector may search an identifier of the related rule using the tag value assigned to the monitoring data in the mapping table and may obtain the related rule using the identifier of the searched rule in the role storage.

In embodiments, the apparatus may further include a metadata register for registering metadata for interpreting the monitoring data and a tag value assigned to the metadata, wherein the event detector uses the obtained tag value to determine metadata related to the monitoring data among the pre-registered metadata, interprets the monitoring data using the determined metadata, and detects the event in the interpreted monitoring data.

In embodiments, in response to determining that a new rule has been registered, the event detector may determine data related to the new rule among pre-stored monitoring data by using a tag value assigned to the new rule and may detect an event in the determined data by applying the new rule.

In embodiments, the monitoring data may include values for one or more monitoring elements, the rule may include function and condition items, a function that performs a predetermined operation based on the values of one or more monitoring elements may be set in the function item, and a condition for an output value of the set function may be set in the condition item.

In accordance with another aspect of the present invention, provided is a method of detecting events, wherein the method is performed by a computing device and includes a step of registering rules for event detection and a tag value assigned to the rules; a step of obtaining monitoring data and a tag value assigned to the monitoring data; a step of determining a rule related to the monitoring data among the pre-registered rules using the obtained tag value; and a step of detecting an event in the monitoring data by applying the determined rule.

In accordance with yet another aspect of the present invention, provided is a computer program connected to a computing device and stored in a computer-readable recording medium to execute a step of registering rules for event detection and a tag value assigned to the rules; a step of obtaining monitoring data and a tag value assigned to the monitoring data; a step of determining a rule related to the monitoring data among the pre-registered rules using the obtained tag value; and a step of detecting an event in the monitoring data by applying the determined rule.

Advantageous Effects

According to the above-described embodiments of the present invention, a common tag value can be assigned between monitoring data and a rule related thereto. Accordingly, when specific monitoring data is obtained, a rule associated with the specific monitoring data can be automatically determined using a tag value, and an event can be automatically detected from the specific monitoring data by applying the determined rule. That is, through a pre-assigned tag value, the process of determining an association rule and detecting an event can be fully automated, and thus the efficiency of monitoring data analysis can be greatly improved.

In addition, a common tag value can be assigned between monitoring data and metadata related thereto. Accordingly, when specific monitoring data is obtained, metadata associated with the specific monitoring data can be automatically determined using a tag value, and the specific monitoring data can be automatically interpreted (e.g., parsing, decoding) using the determined metadata. Also, an event detection process can be performed automatically. That is, through a pre-assigned tag value, determination of associated metadata, data decoding, and an event detection process can be fully automated, thereby greatly improving the efficiency of monitoring data analysis.

In addition, various types of rules can be provided. The number of detectable events can be increased through the provided rules, and various types of events can be defined.

Effects according to the technical idea of the present invention are not limited to the effects mentioned above, and other effects not mentioned will be clearly understood by those skilled in the art from the description below.

DESCRIPTION OF DRAWINGS

FIG. 1 is an exemplary block diagram schematically illustrating an apparatus for detecting events according to embodiments of the present invention.

FIG. 2 is an exemplary diagram for explaining the structure of monitoring data that may be referenced in embodiments of the present invention.

FIG. 3 is an exemplary flowchart showing detailed operation of a metadata register according to embodiments of the present invention.

FIG. 4 is an exemplary diagram for explaining tagging operation of an event detector according to embodiments of the present invention.

FIG. 5 is an exemplary flowchart showing the first detailed operation of an event detector according to embodiments of the present invention.

FIG. 6 is an exemplary flowchart showing the second detailed operation of an event detector according to embodiments of the present invention.

FIG. 7 is a diagram for explaining an example of using an apparatus for detecting events according to embodiments of the present invention.

FIG. 8 is an exemplary flowchart showing a method of detecting events according to embodiments of the present invention.

FIGS. 9 to 18 are exemplary diagrams for explaining examples of using various types of event detection rules that may be referenced in embodiments of the present invention.

FIG. 19 shows an exemplary computing device capable of implementing an apparatus for detecting events according to embodiments of the present invention.

BEST MODE

Hereinafter, the present invention will be described in detail by explaining exemplary embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. The present invention is defined only by the categories of the claims.

Here, when reference numerals are applied to constituents illustrated in each drawing, it should be noted that like reference numerals indicate like elements throughout the specification. In addition, in the following description of the present invention, a detailed description of known functions and configurations incorporated herein will be omitted when it may make the subject matter of the present invention unclear.

Unless defined otherwise, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein. The terms used in the present specification are used to explain a specific exemplary embodiment and not to limit the present inventive concept. Thus, the expression of singularity in the present specification includes the expression of plurality unless clearly specified otherwise in context.

In describing the components of the embodiments of the present invention, terms such as first, second, A, B, (a), and (b) may be used. These terms are used to distinguish each component from other components, and the nature or order of the components is not limited by these terms. It should be understood that when an element (e.g., first) is referred to as being "connected to" or "coupled to" another element (e.g., second), the element may be directly connected or coupled to the other element or intervening element (e.g., a third element) may be present.

It will be further understood that the terms "comprise" and/or "comprising", when used in this specification, specify the presence of stated components, steps, operations, and/or elements, but do not preclude the presence or addition of one or more other components, steps, operations, and/or elements thereof.

Hereinafter, various embodiments of the present invention will be described in detail with reference to the accompanying drawings.

FIG. 1 is an exemplary block diagram schematically illustrating an apparatus 100 for detecting events according to embodiments of the present invention.

As shown in FIG. 1, the apparatus 100 for detecting events may include a storage 140, a metadata register 110, a rule register 120, and an event detector 130. However, this configuration is only a preferred embodiment for achieving the purpose of the present invention, and some components may be added or deleted as needed. In addition, the components (e.g., 110) shown in FIG. 1 represent functionally distinct functional elements, and a plurality of components may be implemented in a form integrated with each other in an actual physical environment. In addition, in an actual physical environment, each of the components (e.g., 110) may be separated into a plurality of detailed functional elements or may be implemented in a plurality of physical computing devices. In addition, all of the components (e.g., 110) illustrated in FIG. 1 may not be essential components for implementing the apparatus 100 for detecting events. For example, the apparatus 100 for detecting events may be implemented in a form in which some of the components (e.g., 110) illustrated in FIG. 1 are omitted.

For example, the computing devices may include notebooks, desktops, laptops, etc., but the present invention is not limited thereto. In addition, the computing devices may include all types of devices equipped with a computing function. An example of a computing device is shown in FIG. 19. Hereinafter, each component of the apparatus 100 for detecting events will be described, but for convenience of explanation, the apparatus 100 for detecting events will be abbreviated as "detection device 100".

The storage 140 may store various information and/or data related to operation of the detection device 100. The storage 140 according to embodiments may include a data storage 141, a metadata storage 142, a role storage 143, and a mapping table 144.

The data storage 141 may store data (hereinafter referred to as "monitoring data") related to a monitoring object. For example, the data storage 141 may store monitoring data and a data identifier corresponding thereto. For example, the monitoring data may be sensing data measured through various sensors provided in a monitoring object, but the present invention is not limited thereto. In addition, the monitoring object may be set in various ways, such as a vehicle system and a process facility, without particular limitation.

Monitoring data may be designed in various structures and/or formats. For example, as shown in FIG. 2, monitoring data may include a timestamp and data about one or more monitoring elements (e.g., measurement values). Specifically, first monitoring data (D1) may include measurement values for a plurality of monitoring elements (elements 1 to 3) and a timestamp (TS1) indicating a measurement time point, and second monitoring data (D2) may include measurement values for a plurality of monitoring elements (elements 1 to 3) and a timestamp (TS2).

In this case, the monitoring elements refer to elements measured to monitor a monitoring object. For example, when the monitoring object is a vehicle system, the monitoring elements may include speed, position, heading angle, direction indicator status (e.g., blinking status), front and rear images, and the like. However, the present invention is not limited thereto.

For reference, the term "elements" may be used interchangeably with attributes, features, fields, and the like in the art.

Next, the metadata storage 142 may store metadata associated with monitoring data. For example, the metadata storage 142 may store metadata and a metadata identifier corresponding to the metadata. Metadata may include various information for interpreting monitoring data (e.g., decoding, parsing, etc.). For example, the metadata may include the format of monitoring data (e.g., format of sensing data, message format, etc.) and communication methods (e.g., method of encoding/decoding communication data, format of communication data frame, etc.). However, the present invention is not limited thereto.

Next, the role storage 143 may store rules for detecting events in monitoring data. For example, the role storage 143 may store rules and a rule identifier corresponding to the rules. Various examples of events and rules will be described later with reference to Tables 1 to 10.

Next, the mapping table 144 may store monitoring data, metadata, and association (mapping) relationships with rules. For example, each entry of the mapping table 144 has a format of a key and a value, and related monitoring data, metadata, and rule identifiers may be stored in a value field.

In embodiments, a common tag value may be assigned to monitoring data, metadata, and rules related to each other. In addition, the assigned tag value may be used as a key value of the mapping table 144. In this case, the event detector 130 may easily obtain related metadata and rules by inquiring the mapping table 144 with the tag value of the monitoring data.

Next, the metadata register 110 may perform a registration process for metadata. One example of such a registration process is shown in FIG. 3.

As shown in FIG. 3, the registration process may start at step S10 of receiving a metadata registration request. In this step, the metadata register 110 may receive a registration request including metadata (M), a metadata identifier (M-ID), and a tag value (TagVal) from a user. In embodiments, the metadata register 110 may provide a predetermined user interface, and a user may input information (e.g., metadata, metadata identifier, tag value, etc.) for a metadata registration request through the provided user interface.

In step S20, the metadata register 110 may store the requested metadata (M) and metadata identifier (M-ID) in the metadata storage 142. In some cases, the metadata register 110 may also store a tag value (TagVal) assigned to the metadata (M) in the metadata storage 142.

In step S30, the metadata register 110 may register an identifier (M-ID) of the requested metadata (M) and the assigned tag value (TagVal) in the mapping table 144. For example, the metadata register 110 may register an identifier (M-ID) of the requested metadata in an entry of the mapping table 144 having the tag value (TagVal) as a key value. When the entry does not exist, the metadata register 110 may create an entry having the tag value (TagVal) as a key value, and may register an identifier (M-ID) of metadata in the created entry.

For reference, FIG. 3 shows an example in which steps S20 and S30 are sequentially performed, but steps S20 and S30 may be performed in a different order from the order shown in FIG. 3 or may be performed simultaneously.

Next, the rule register 120 may perform a registration process for rules. The registration process may be performed as shown in FIG. 3. For example, the rule register 120 may receive a registration request including a rule, a rule identifier, and a tag value from a user, and may store the requested rule and rule identifier in the role storage 143 in response thereto. In some cases, a tag value assigned to the rule may also be stored in the role storage 143. In addition, the rule register 120 may register the rule identifier in an entry of the mapping table 144 having the tag value as a key value.

Next, the event detector 130 may obtain monitoring data and perform an event detection process on the obtained monitoring data. For example, the event detector 130 may receive data in real time (continuously) from a monitoring object. Alternatively, the event detector 130 may obtain monitoring data from a predetermined storage.

More specifically, in response to receiving new monitoring data, the event detector 130 may perform an event detection process on the new monitoring data. Alternatively, in response to registration of a new rule, the event detector 130 may perform an event detection process using the registered new rule. These event detection processes will be described in detail later with reference to FIGS. 5 and 6.

In addition, the event detector 130 may tag information about a detected event to monitoring data. For example, the information about the event may include the name and identifier of the event and the name and identifier of the rule, but the present invention is not limited thereto. For example, as shown in FIG. 4, the event detector 130 may tag a rule identifier (e.g., R1) of a corresponding event to monitoring data (e.g., D1) in which an event is detected.

Monitoring data for which the event detection process has been performed may be stored in the data storage 141. For example, monitoring data in which an event is detected and tagged event information may be stored in the data storage 141. In addition, monitoring data for which an event is not detected may also be stored in the data storage 141. These operations may be performed by the event detector 130 or other modules.

In addition, at least a part of each component (e.g., 110) shown in FIG. 1 may mean software or hardware such as a field programmable gate array (FPGA) or an application-specific integrated circuit (ASIC). However, the components are not limited to software or hardware, and may be configured to reside on an addressable storage medium or configured to execute one or more processors. Functions provided within the components may be implemented by more subdivided components, or may be implemented as a single component that performs a specific function by combining a plurality of components.

Hereinafter, detailed operation of an event detector 130 according to embodiments of the present invention will be further described with reference to FIGS. 5 and 6.

FIG. 5 is an exemplary flowchart showing first detailed operation of the event detector 130 according to embodiments of the present invention. The first detailed operation is related to an event detection process for new monitoring data.

As shown in FIG. 5, the first detailed operation may start at step S110 in which the event detector 130 receives new monitoring data (D). In this step, the event detector 130 may receive new monitoring data (D), a data identifier (D-ID), and an assigned tag value (TagVal).

In step S120, the event detector 130 may search metadata and rules associated with the new monitoring data from the mapping table 144 using the tag value (TagVal). As a result, the event detector 130 may obtain an identifier (M-ID) of metadata and an identifier (R-ID) of rules (rule set), which are associated with the new monitoring data.

In step S130, the event detector 130 may obtain metadata associated with the new monitoring data from the metadata storage 142 using the obtained metadata identifier (M-ID).

In step S140, the event detector 130 may obtain rules associated with the new monitoring data from the role storage 143 using the obtained rule identifier (R-ID).

For reference, FIG. 4 shows an example in which steps S130 and S140 are sequentially performed, but steps S130 and S140 may be performed in a different order from the order shown in FIG. 5 or may be performed simultaneously.

In step S150, the event detector 130 may detect an event from the new monitoring data. For example, the event detector 130 may interpret (e.g., parsing, decoding) the new monitoring data using related metadata, and may detect an event by applying a related rule to the interpreted monitoring data. When a condition specified in the rule is satisfied, the event detector 130 may determine that an event has occurred.

The types and forms of rules and examples of events will be described in detail later with reference to Tables 1 to 10.

In addition, although not shown in FIG. 5, when an event is detected, new monitoring data may be tagged with information about the detected event (e.g., event name, event identifier, rule identifier, rule name, etc.). In addition, the new monitoring data and the tagged event information may be stored in the data storage 141.

FIG. 6 is an exemplary flowchart showing second detailed operation of the event detector 130 according to embodiments of the present invention. The second detailed operation is related to an event detection process based on new rules.

As shown in FIG. 6, the second detailed operation may start at step S210 in which the event detector 130 receives a new rule (R). In this step, the event detector 130 may obtain a new rule (R), a rule identifier (R-ID), and an assigned tag value (TagVal) from the rule register 120. Alternatively, the event detector 130 may obtain an identifier (R-ID) of a new rule from the rule register 120, and use the obtained identifier (R-ID) to obtain a new rule (R) and a tag value (TagVal) from the role storage 142. As such, various methods of receiving information about the event detector 130 and new rules may be used without particular limitation.

In step S220, the event detector 130 may search monitoring data and metadata associated with the new rule from the mapping table 144 using the tag value (TagVal). As a result, the event detector 130 may obtain an identifier (D-ID) of monitoring data and an identifier (M-ID) of metadata, which are associated with the new rule.

In step S230, the event detector 130 may obtain monitoring data related to the new rule (that is, to which the new rule is applied) from the data storage 141 using the obtained data identifier (D-ID).

In step S240, the event detector 130 may obtain metadata associated with the new rule from the metadata storage 142 using the obtained metadata identifier (M-ID).

For reference, FIG. 6 shows an example in which steps S230 and S240 are sequentially performed, but steps S230 and S240 may be performed in a different order from the order shown in FIG. 6 or may be performed simultaneously.

In step S250, the event detector 130 may detect an event from the obtained monitoring data. For example, the event detector 130 may interpret (e.g., parsing, decoding) the obtained monitoring data using related metadata, and may detect an event by applying a new rule to the interpreted monitoring data. When a condition specified in the new rule is satisfied, the event detector 130 may determine that an event has occurred.

In addition, although not shown in FIG. 6, when an event is detected, the obtained monitoring data may be tagged with information about the detected event (e.g., event name, event identifier, rule identifier, rule name, etc.). In addition, the tagged event information may be stored in the data storage 141.

So far, detailed operations of the event detector 130 according to embodiments of the present invention have been described with reference to FIGS. 5 and 6. Hereinafter, an example of using the detection device 100 will be described with reference to FIG. 7.

FIG. 7 is an exemplary diagram for explaining an example of using the detection device 100 according to embodiments of the present invention. In particular, FIG. 7 shows a case in which the monitoring object is a vehicle system 10.

As shown in FIG. 7, the vehicle system 10 is equipped with various sensors for sensing (measuring) various monitoring elements (e.g., speed, position, heading angle, status of direction indicators, front and rear images, etc.). In addition, the vehicle system 10 may transmit monitoring data (e.g., D1, D2, D3) including measurement values and timestamps for the monitoring elements to the detection device 100 in real time or non-real time. At this time, a predetermined tag value may be given in advance to each monitoring data (e.g., D1, D2, D3).

As described above, the detection device 100 may obtain associated metadata and rules (e.g., R1) by using tag values assigned to monitoring data (e.g., D1, D2, D3), and may detect an event from monitoring data (e.g., D1) by applying the associated metadata and rules (e.g., R1). In addition, the detection device 100 may tag information (e.g., rule identifier R1) about the detected event to monitoring data (e.g., D1), and may store the monitoring data (e.g., D1) and the tagged event information (e.g., R1) in the data storage 141.

For example, when a first rule for detecting a right turn event and a second rule for detecting an emergency braking event are registered, and a common tag value is given to the monitoring data of the vehicle system 10, the first rule, and the second rule, the detection device 100 may detect an emergency braking event (situation) and a right turn event (situation) from monitoring data received from the vehicle system 10 and may tag event information. In addition, when an emergency braking event and a right turn event are simultaneously detected, the detection device 100 may recognize an emergency braking situation while performing a right turn. As the event detection and tagging process are repeated in the monitoring data of the vehicle system 10, the driving record of the vehicle system 10 may be efficiently analyzed.

So far, the configuration and operation of the detection device 100 according to embodiments of the present invention have been described with reference to FIGS. 1 to 7. As described above, a common tag value may be assigned between monitoring data and a rule related thereto. Accordingly, when specific monitoring data is obtained, a rule associated with the specific monitoring data may be automatically determined using a tag value, and an event may be automatically detected from the specific monitoring data by applying the determined rule. That is, through a pre-assigned tag value, the process of determining an association rule and detecting an event may be fully automated, and thus the efficiency of monitoring data analysis may be greatly improved.

In addition, a common tag value may be assigned between monitoring data and metadata related thereto. Accordingly, when specific monitoring data is obtained, metadata associated with the specific monitoring data may be automatically determined using a tag value, and the specific monitoring data may be automatically decoded using the determined metadata. Also, an event detection process may be performed automatically. That is, through a pre-assigned tag value, determination of associated metadata, data decoding, and an event detection process may be fully automated, thereby greatly improving the efficiency of monitoring data analysis.

Hereinafter, a method of detecting events according to embodiments of the present invention will be described with reference to FIG. 8.

Each step of the method to be described below may be implemented using one or more instructions executed by a processor of a computing device. For convenience of understanding, the method of the present invention will be described on the assumption that the method is performed by the detection device 100 having the configuration illustrated in FIG. 1. Accordingly, when an operating subject of a specific step is omitted, a component (e.g., 110) of the detection device 100 illustrated in FIG. 1 may be the operating subject.

FIG. 8 is an exemplary flowchart showing a method of detecting events according to embodiments of the present invention. However, the above flowchart is only a preferred embodiment for achieving the purpose of the present invention, and some steps may be added or deleted as necessary.

As shown in FIG. 8, the method of detecting events may start in step S310 of registering rules and metadata. In description of the process of registering rules and metadata, the description of the metadata register 110 and the rule register 120 are referred to. Repeated description will be omitted.

In step S320, it may be determined whether new monitoring data is received. When new monitoring data is received, step S330 may be performed. In addition to the new monitoring data, a data identifier and a tag value assigned to data may also be received.

In step S330, related metadata and rules may be obtained using the tag value of monitoring data. For example, the detection device 100 may search the identifier of the related metadata and the identifier of the rules in the mapping table 144 using the tag value of the monitoring data, and may use the search result to obtain related metadata and rules in the metadata storage 142 and the role storage 143.

In step S340, an event may be detected using the related metadata and rules. For example, the detection device 100 may interpret new monitoring data using the related metadata, and may detect an event by applying related rules to the interpreted monitoring data.

In step S350, when an event is detected, new monitoring data may be tagged with information about the event. The new monitoring data and the tagged event information may be stored in the data storage 141.

For reference, step S310 may be performed by the metadata register 110 and the rule register 120, and steps S320 to S350 may be performed by the event detector 130.

In addition, according to embodiments of the present invention, even when a new rule is registered, the event detection process may be performed. For example, in response to registration of a new rule, the detection device 100 may obtain a new rule and related monitoring data from the data storage 141 and may detect an event by applying the new rule to the obtained monitoring data. For more detailed description of this embodiment, refer to the description of FIG. 6.

So far, the method of detecting events according to embodiments of the present invention has been described with reference to FIG. 8. Hereinafter, various types of event detection rules that may be referenced in embodiments of the present invention will be described.

The first type of rule is the most basic rule and may be defined to include the items listed in Table 1 below. In addition, some items may be omitted or added when necessary. For example, the first type of rule may further include action items performed when a condition is satisfied, tagging condition items (e.g., items used when event occurrence conditions and tagging conditions are set separately), and items for setting information to be tagged.

TABLE 1

| Items | Description |
|---|---|
| Name | Name of rule (or event) |
| Function | Function that performs predetermined operation based on values of one or more monitoring elements |
| Maximum allowable delay | Maximum timestamp difference between monitoring element values input to set function |
| Conditions | Conditions on output value of function (e.g., output value <3, output value == 10.11) |

As shown in Table 1, a function that performs predetermined operation based on the values of one or more monitoring elements may be set in the function item. Other items are described with reference to Table 1. For reference, the name of a rule may be used as the identifier of the rule, or a separate identifier may be assigned to each rule. In addition, when the condition of a rule is satisfied, monitoring data (e.g., timestamp of monitoring data) may be tagged with information about an event. For example, the timestamp of corresponding data may be tagged with the name of the first rule. Various events may be detected through the first type of rule. For example, a speed exceeding event (e.g., a situation in which a driving speed exceeds a specified value) may be detected through the first type of rule. As a more specific example, as shown in FIG. 9, through the first type of rule, an event in which the sum of two signals (A, B) is equal to or less than a certain value ("71") may be detected. FIG. 9 shows an example in which a function that calculates the sum of two signals (A, B) is set in the function item, and an event is detected at time "t" as a result of setting the condition that the output value of the function set in the condition item is "71" or less. For reference, in the figures below FIG. 9, "abs" means a function for obtaining an absolute value, and a "V"-shaped symbol indicates that an event has been detected.

Next, the second type of rule is a rule defined based on history. For example, the second type of rule may be defined to include the items listed in Table 2 below. In addition, some items may be omitted or added when necessary. Description of each item is shown in Table 2 below.

TABLE 2

| Items | Description |
|---|---|
| Name | Name of rule (or event) |
| Buffer size | Size of buffer that stores output values of set function (e.g., when buffer size is 10, 10 output values are stored from past time t − 9 to current time t) |
| Function | (1) Function that performs predetermined operation based on values of one or more monitoring elements, (2) Function that performs predetermined operation based on values stored in buffer |
| Maximum allowable delay | Maximum timestamp difference between monitoring elements that are allowed to input to set function |
| Conditions | Conditions on output value of function (e.g., output value <3, output value == 10.11) |

Various events may be detected through the second type of rule. For example, as shown in FIG. 10, through the second type of rule, an event in which the difference between the sum values of two signals (A, B) at different time points (t−1, t) exceeds a certain value ("10") may be detected. In FIG. 10, in the function item, "Function 1" for obtaining the sum of two signals (A, B) and "Function 2" for obtaining the difference between function output values at two time points are set. As a result of setting the condition that the output value of Function 2 exceeds "10" in the condition item, an event is detected at a time point "t". Next, the third type of rule is a rule defined based on multiple functions and multiple conditions, and may be defined to include the items listed in Table 3 below. In addition, some items may be omitted or added when necessary.

TABLE 3

| Items | Description |
|---|---|
| Name | Name of rule (or event) |
| Order | Whether order of applying functions (conditions) is sequential (T/F) |
| Multiple functions | Multiple functions composed of a plurality of functions, each function performing predetermined operation based on values of one or more monitoring elements |
| Maximum allowable delay | Maximum timestamp difference between monitoring elements that are allowed to input to set function |
| Multiple conditions | Multiple conditions composed of a plurality of conditions, each condition being condition on output value of function |

Referring to Table 3, when the order item is set to "T (True)", when the output value of the k-th function (k being a natural number greater than or equal to 1) satisfies the k-th condition and the output value of the (k+1)-th function satisfies the (k+1)-th condition, information about an event may be tagged. Conversely, when the order item is set to "F (False)", when the output value of the k-th function satisfies the k-th condition and the output value of the x-th function satisfies the x-th condition regardless of order, information about an event may be tagged. Various events may be detected through the third type of rule. For example, as shown in FIG. 11, through the third type of rule, an event in which the sum of two signals (A, B) sequentially satisfies a plurality of conditions (conditions 1 to 3) may be detected (when the order item is "T"). In FIG. 11, a function that calculates the sum of two signals (A, B) is set in the function item, as a result of setting three conditions (conditions 1 to 3) in the condition item, events are detected at time "t" and time "t+1" (that is, when the set conditions are sequentially satisfied). For reference, in FIG. 11, it is assumed that a plurality of identical functions are set in multiple function items. Next, the fourth type of rule is a rule in which the second type of rule and the third type of rule are combined, and may be defined to include the items described in Table 4 below. In addition, some items may be omitted or added when necessary. Description of each item is shown in Table 4 below.

TABLE 4

| Items | Description |
|---|---|
| Name | Name of rule (or event) |
| Buffer size | Size of buffer that stores output value of set function (e.g., when buffer size is 10, 10 output values are stored from past time t − 9 to current time t) |
| Order | Whether order of applying functions (conditions) is sequential |
| Multiple functions | (1) Multiple functions composed of a plurality of functions, each function performing predetermined operation based on values of one or more monitoring elements (2) Function that performs predetermined operation based on values stored in buffer |
| Maximum allowable delay | Maximum timestamp difference between monitoring elements that are allowed to input to set function |
| Multiple conditions | Multiple conditions composed of a plurality of conditions, each condition being condition on output value of function |

Various events may be detected through the fourth type of rule. For example, as shown in FIG. 12, Through the fourth type of rule, an event in which the difference between the sum values of two signals (A, B) at different time points (t−1, t, t+1) satisfies a plurality of conditions (conditions 1 and 2) non-sequentially may be detected (when the order item is "F"). In FIG. 12, in the function item, "Function 1" for obtaining the sum of two signals (A, B) and "Function 2" for obtaining the difference between the function output values of two time points are set. As a result of setting two conditions (conditions 1 and 2) in the condition item, an event is detected at the time point "t+1" (i.e., the time point at which condition 1 is satisfied after condition 2). For reference, FIG. 12 also assumes that a plurality of identical functions are set in multiple function items. Next, the fifth type of rule is a trend-related rule and may be defined to include the items described in Table 5 below. In addition, some items may be omitted or added when necessary.

TABLE 5

| Items | Description |
|---|---|
| Name | Name of rule (or event) |
| Buffer size | Size of buffer that stores output value of set function (e.g., when buffer size is 10, 10 output values are stored from past time t − 9 to current time t) |
| Function | Function that performs predetermined operation based on values of one or more monitoring elements |
| Maximum allowable delay | Maximum timestamp difference between monitoring elements that are allowed to input to set function |

TABLE 5-continued

| Items | Description |
|---|---|
| Lower bound of slope | Lower bound of slope of output values of function stored in buffer (e.g., lower bound of slope of linear function) |
| Upper bound of slope | Upper bound of slope of output values of function stored in buffer (e.g., upper bound of slope of linear function) |
| Confidence | Value between 0 and 1 |
| Conditions | When output values stored in buffer are line-fitted with linear approximation function (y = ax + b), 1) Lower bound of slope >= a or Lower bound of slope <= a 2) Upper bound of slope <= a or Upper bound of slope >= a 3) Coefficient of determination of linear function >= confidence value |

Referring to Table 5, when at least one of three conditions (e.g., upper bound condition, lower bound condition, coefficient of determination condition) specified in the fifth type of rule is satisfied, information about an event may be tagged. Description of each item is shown in Table 5 below. Various events may be detected through the fifth type of rule. For example, through the fifth type of rule, an emergency braking event (e.g., a situation where the slope of driving speed is less than or equal to a lower bound) or a rapid acceleration event (e.g., a situation where the slope of driving speed is greater than or equal to an upper bound) may be detected. A more specific example is described with reference to FIG. 13. In FIG. 13, a "function" for obtaining the negative value of a signal (A) is set in the function item. As a result of setting the condition that the slope is "3" or more and the coefficient of determination is "0.7" or more in the condition item, an event is detected at the time point "t+20". For reference, in FIG. 13, since the buffer size item is set to "10", 10 signal values are line-fitted with a linear function. Next, the sixth type of rule is a rule related to the heading angle of a moving object such as a vehicle system, and may be defined to include the items listed in Table 6 below. In addition, some items may be omitted or added when necessary.

TABLE 6

| Items | Description |
|---|---|
| Name | Name of rule (or event) |
| Buffer size | Size of buffer that stores lateral heading angle of vehicle |
| Lower bound | Lower bound of difference between heading angles stored in buffer or lower bound of heading angle stored in buffer |
| Upper bound | Upper bound of difference between heading angles stored in buffer or upper bound of heading angle stored in buffer |
| Conditions | 1) Heading angle stored in buffer (or difference between two heading angles) >= lower bound or heading angle stored in buffer (or difference between two heading angles) <= lower bound 2) heading angle stored in buffer (or difference between two heading angles <= upper bound or heading angle stored in buffer (or difference between two heading angles >= upper bound |

Referring to Table 6, when at least one of two conditions (e.g., upper bound condition, lower bound condition) specified in the sixth type of rule is satisfied, information about an event may be tagged. Description of each item is shown in Table 6 below. For reference, the lateral heading angle of a moving object may be calculated from GPS coordinate values. Various events may be detected through the sixth type of rule. For example, through the sixth type of rule, events such as left turn, right turn, and U-turn (e.g., when the lateral heading angle is greater than the upper bound) may be detected. As a more specific example, as shown in FIG. 14, when a rule is set, an event may be detected at a time point ($P_8$) when the lateral heading angle falls within the range of "240 degrees" to "300 degrees". Next, the seventh type of rule is a rule related to the heading angle of a moving object such as a vehicle system, and may be defined to include the items described in Table 7 below. In addition, some items may be omitted or added when necessary.

TABLE 7

| Items | Description |
|---|---|
| Name | Name of rule (or event) |
| Buffer size | Size of buffer that stores longitudinal heading angle of vehicle |
| Lower bound | Lower bound of difference between heading angles stored in buffer or lower bound of heading angle stored in buffer |
| Upper bound | Upper bound of difference between heading angles stored in buffer or upper bound of heading angle stored in buffer |
| Conditions | 1) Heading angle stored in buffer (or difference between two heading angles) >= lower bound or heading angle stored in buffer (or difference between two heading angles) <= lower bound 2) Heading angle stored in buffer (or difference between two heading angles) <= upper bound or heading angle stored in buffer (or difference between two heading angles) >= upper bound |

Referring to Table 7, when at least one of two conditions (e.g., upper bound condition, lower bound condition) specified in the seventh type of rule is satisfied, information about an event may be tagged. Description of each item is shown in Table 7 below. For reference, the longitudinal heading angle of a moving object may be calculated from altitude values. Next, the eighth type of rule is a rule based on the number of occurrences of an event of interest, and may be defined to include the items listed in Table 8 below. In addition, some items may be omitted or added when necessary.

TABLE 8

| Items | Description |
|---|---|
| Name | Name of rule (or event) |
| Event of interest | Event to be counted |
| Time window | Size of time interval in which events of interest are accumulated and counted e.g., When time window is 10, events of interest occurring from past time t − 9 to current time t are counted. |
| Count | Number of times event of interest occurred (observed) |
| Conditions | Number of occurrences of event of interest within time window >= count |

Referring to Table 8, when the count condition specified in the eighth type of rule is satisfied, information about an event may be tagged. Description of each item is shown in Table 8 below. Various events may be detected through the eighth type of rule. For example, through the eighth type of rule, an event in which emergency braking is repeated a certain number of times or more may be detected. As a more specific example, as shown in FIG. 15, when the rule is set, an event (e.g., a situation in which an error occurs three or more times within 30 ms) may be detected at a time point ("110 ms") where the event "A" of interest occurs three or more times within "30 ms". Alternatively, as shown in FIG. 16, an event (e.g., a situation in which a left turn occurs two or more times within 10 seconds) may be detected at a time point ("9000 ms") where the event "A" of interest occurs two or more times within "10,000 ms". Next, the ninth type of rule is a rule related to event duration time, and may be defined to include the items described in Table 9 below. In addition, some items may be omitted or added when necessary.

TABLE 9

| Items | Description |
|---|---|
| Name | Name of rule (or event) |
| Event of interest | Monitoring object event |
| Duration time | Duration time of event of interest |
| Maximum allowable delay | Maximum value of occurrence interval of event of interest |
| Conditions | Total time over which event of interest occurred continuously >= duration time |

Various events may be detected through the Ninth type of rule. For example, through the ninth type of rule, an event in which a speed is maintained within a specified range for a predetermined time may be detected. As a more specific example, as shown in FIG. 17, when the rule is set, an event (e.g., driving for more than 50 ms at a speed exceeding 50) may be detected at a time point ("180 ms") where occurrence of event "A" of interest lasts for more than "150 ms". Next, the tenth type of rule is a rule for detecting a compound event, and may be defined to include the items listed in Table 10 below. In addition, some items may be omitted or added when necessary.

TABLE 10

| Items | Description |
|---|---|
| Name | Name of rule (or event) |
| Multiple events | Multiple events of interest to be monitored |
| Maximum allowable delay | Maximum value of occurrence intervals of multiple events of interest |
| Conditions | Occurrence intervals of multiple events of interest <= Maximum allowable delay |

Referring to Table 10, when the condition of the tenth type of rule is satisfied (i.e., when a plurality of events of interest set within the maximum allowable delay occur), information about an event may be tagged. Description of each item is shown in Table 10 below. Various events may be detected through the tenth type of rule. For example, an event of emergency braking while turning right may be detected through the tenth type of rule. As a more specific example, as shown in FIG. 18, when the rule is set, an event (e.g., driving at a speed greater than 50 and turning left within 10 ms) may be detected at a time point ("110 ms") where events "A" and "B" of interest occur within "10 ms". So far, various types of rules that may be referenced in embodiments of the present invention have been described with reference to Tables 1 to 10 and FIGS. 9 to 18. Through the various types of rules described above, the number of detectable events may be increased, and various types of events may be defined.

Hereinafter, an exemplary computing device 200 capable of implementing the detection device 100 according to embodiments of the present invention will be described with reference to FIG. 19.

FIG. 19 is an exemplary hardware configuration diagram showing the computing device 200.

As shown in FIG. 19, the computing device 200 may include one or more processors 210, a bus 250, a communication interface 270, a memory 230 for loading computer programs 291 executed by the processors 210, and a storage 290 for storing the computer programs 291. However, FIG. 19 shows only the components related to the embodiments of the present invention. Accordingly, a person skilled in the art to which the present invention pertains may know that other general-purpose components may be further included in addition to the components shown in FIG. 19.

The processors 210 may control overall operations of each component of the computing device 200. The processors 210 may include Central Processing Unit (CPU), Micro Processor Unit (MPU), Micro Controller Unit (MCU), Graphic Processing Unit (GPU), or any form of processor well known in the art of the present invention. In addition, the processors 210 may perform operations on at least one application or program for executing operations/methods according to embodiments of the present invention. The computing device 200 may include one or more processors.

Next, the memory 230 may store various data, commands, and/or information. The memory 230 may load one or more computer programs 291 from the storage 290 to execute operations/methods according to embodiments of the present invention. When the computer programs 291 are loaded, the module (e.g., 110) as illustrated in FIG. 1 may be implemented on the memory 230. The memory 230 may be implemented with volatile memory such as RAM, but the scope of the present invention is not limited thereto.

Next, the bus 250 may provide a communication function between components of the computing device 200. The bus 250 may be implemented with various types of buses such as an address bus, a data bus, and a control bus.

Next, the communication interface 270 may support wired/wireless Internet communication of the computing device 200. In addition, the communication interface 270 may support various communication methods other than Internet communication. Thus, the communication interface 270 may include a communication module well known in the art of the present invention.

Next, the storage 290 may non-temporarily store one or more programs 291. The storage 290 may include Read Only Memory (ROM), Erasable Programmable ROM (EPROM), Electrically Erasable Programmable ROM (EEPROM), non-volatile memory such as flash memory, a hard disk, a removable disk, or any form of computer-readable recording medium well known in the art to which the present invention pertains.

Next, when the computer programs 291 are loaded into the memory 230, the computer programs 291 may include one or more instructions that cause the processors 210 to perform operations/methods according to embodiments of the present invention. That is, the processors 210 may perform operations/methods according to embodiments of the present invention by executing the instructions.

For example, the computer programs 291 may include instructions for performing an operation of registering rules for event detection and a tag value assigned to the rules, an operation of obtaining monitoring data and a tag value assigned to the monitoring data, an operation of determining a rule related to the monitoring data among pre-registered rules using the obtained tag value, and an operation of detecting events in monitoring data by applying the determined rule. In this case, the detection device 100 according to embodiments of the present invention may be implemented through the computing device 200.

So far, with reference to FIG. 19, the exemplary computing device 200 capable of implementing the detection device 100 according to embodiments of the present invention has been described.

The technical idea of the present invention described with reference to FIGS. 1 to 19 so far may be implemented as computer-readable code on a computer-readable medium. For example, the computer-readable recording medium may be a removable recording medium (CD, DVD, Blu-ray disc, USB storage device, removable hard disk) or a fixed recording medium (ROM, RAM, computer-equipped hard disk). The computer programs recorded on the computer-readable recording medium may be transmitted to another computing device through a network such as the Internet, installed in the other computing device, and used in the other computing device.

In the above description, even when all components constituting an embodiment of the present invention are described as being combined or integrally operated, the technical idea of the present invention is not necessarily limited to the embodiment. That is, within the scope of the present invention, one or more of the components may be selectively operated in combination.

Although operations are shown in a specific order in the drawings, it should not be understood that the operations must be performed in the specific order or in a sequential order, or that all operations must be performed to obtain a desired result. In certain circumstances, multitasking and parallel processing may be advantageous. Furthermore, it should be understood that separation of the various components in the above-described embodiments is not necessarily required, and that the described program components and systems may generally be integrated into a single software product or packaged into multiple software products.

Embodiments of the present invention have been described with reference to the accompanying drawings. However, those skilled in the art will understand that the present invention can be easily changed or modified into other specified forms without change or modification of the technical spirit or essential characteristics of the present invention. Therefore, it should be understood that the aforementioned examples are only provided by way of example and not provided to limit the present invention. The scope of protection of the present invention should be defined by the following claims, and all technical ideas within the scope of protection should be construed as being included in the scope of the present invention.

The invention claimed is:

1. An apparatus for detecting events, the apparatus comprising:
- a memory configured to store computer-readable instructions; and
- one or more processors configured to execute the instructions to:
  - register rules for event detection and tag values assigned to the rules, and
  - obtain monitoring data continuously in real time from a monitoring object and a tag value assigned to the monitoring data, determine a rule related to the monitoring data among the registered rules using the obtained tag value, and automatically detect an event in the monitoring data by applying the determined rule,
  - wherein the monitoring data comprises values for one or more monitoring elements,
  - wherein the rule comprises a function item and a condition item,
  - wherein a function that performs a predetermined operation based on the values of one or more monitoring elements is set in the function item,
  - wherein a condition for an output value of the set function is set in the condition item,
  - wherein the monitoring object is a vehicle system including sensors configured to obtain the values of the one or more monitoring elements, and
  - wherein the one or more monitoring elements include at least one among a speed of the vehicle system, a position of the vehicle system, a heading angle of the vehicle system, a direction indicator status of the vehicle system and an image obtained by the vehicle system.

2. The apparatus according to claim 1, wherein the monitoring data is tagged with information about the detected event.

3. The apparatus according to claim 1, wherein the one or more processors are further configured to execute the instructions to:
- store the rule in a role storage and register an identifier of the rule and a tag value assigned to the rule in a mapping table, and
- search an identifier of the related rule using the tag value assigned to the monitoring data in the mapping table and obtain the related rule using the identifier of the searched rule in the role storage.

4. The apparatus according to claim 1, wherein the one or more processors are further configured to execute the instructions to:
- register metadata for interpreting the monitoring data and a tag value assigned to the metadata,
- use the obtained tag value to determine metadata related to the monitoring data among the registered metadata,
- interpret the monitoring data using the determined metadata, and
- detect the event in the interpreted monitoring data.

5. The apparatus according to claim 1, wherein, in response to determining that a new rule has been registered, the one or more processors are further configured to execute the instructions to determine data related to the new rule among pre-stored monitoring data by using a tag value assigned to the new rule and detect an event in the determined data by applying the new rule.

6. The apparatus according to claim 1, wherein the monitoring data further comprises a timestamp for a value of the monitoring element,
- the rule further comprises a maximum allowable delay item, and
- in the maximum allowable delay item, a maximum timestamp difference value of a plurality of monitoring element values input to the set function is set.

7. The apparatus according to claim 1, wherein the rule comprises multiple function, multiple condition, and order items,
- in the multiple function item, a first function and a second function are set,
- in the multiple condition item, a first condition for an output value of the first function and a second condition for an output value of the second function are set, and
- in the order item, a value indicating whether the first condition and the second condition are sequentially determined is set.

8. The apparatus according to claim 1, wherein
- in the condition item, a condition for a slope of a linear approximation function obtained from a plurality of values output by the set function is set.

9. The apparatus according to claim 1, wherein
- in the condition item, a condition for a coefficient of determination of a linear approximation function obtained from a plurality of values output by the set function is set.

10. The apparatus according to claim 1, wherein the monitoring data is data about a moving object, in the condition item, a condition for a lateral heading angle or longitudinal heading angle of the moving object is set.

11. The apparatus according to claim 1, wherein in the condition item, a condition for a number of occurrences of an event of interest is set.

12. The apparatus according to claim 1, wherein in the condition item, a condition for duration time of an event of interest is set.

13. A method of detecting events, wherein the method is performed by a computing device including a memory configured to store computer-readable instructions and one or more processors configured to execute the instructions to perform the method, and the method comprises:

a step of registering rules for event detection and tag values assigned to the rules;

a step of obtaining monitoring data continuously in real time from a monitoring object and a tag value assigned to the monitoring data;

a step of determining a rule related to the monitoring data among the registered rules using the obtained tag value; and a step of automatically detecting an event in the monitoring data by applying the determined rule, wherein the monitoring data comprises values for one or more monitoring elements, wherein the rule comprises a function item and a condition item, wherein a function that performs a predetermined operation based on the values of one or more monitoring elements is set in the function item, wherein a condition for an output value of the set function is set in the condition item, wherein the monitoring object is a vehicle system including sensors configured to obtain the values of the one or more monitoring elements, and wherein the one or more monitoring elements include at least one among a speed of the vehicle system, a position of the vehicle system, a heading angle of the vehicle system, a direction indicator status of the vehicle system and an image obtained by the vehicle system.

14. A non-transitory computer-readable recording medium storing a computer program that, when executed by a computing device, causes the computing device to perform a method of detecting events, the method comprising:

a step of registering rules for event detection and tag values assigned to the rules;

a step of obtaining monitoring data continuously in real time from a monitoring object and a tag value assigned to the monitoring data;

a step of determining a rule related to the monitoring data among the registered rules using the obtained tag value; and a step of automatically detecting an event in the monitoring data by applying the determined rule, wherein the monitoring data comprises values for one or more monitoring elements, wherein the rule comprises a function item and a condition item, wherein a function that performs a predetermined operation based on the values of one or more monitoring elements is set in the function item, wherein a condition for an output value of the set function is set in the condition item, wherein the monitoring object is a vehicle system including sensors configured to obtain the values of the one or more monitoring elements, and wherein the one or more monitoring elements include at least one among a speed of the vehicle system, a position of the vehicle system, a heading angle of the vehicle system, a direction indicator status of the vehicle system and an image obtained by the vehicle system.

* * * * *